United States Patent
Hedinsson et al.

(10) Patent No.: US 10,353,945 B2
(45) Date of Patent: Jul. 16, 2019

(54) SYSTEMS AND METHODS FOR STREAMING MEDIA CONTENTS BASED ON ATTRIBUTE TAGS

(71) Applicant: Disney Enterprises, Inc., Burbank, CA (US)

(72) Inventors: Skarphedinn Hedinsson, Encino, CA (US); Katharine S. Ettinger, Santa Monica, CA (US); Christopher Eich, La Canada, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 216 days.

(21) Appl. No.: 15/199,216

(22) Filed: Jun. 30, 2016

(65) Prior Publication Data
US 2018/0004746 A1    Jan. 4, 2018

(51) Int. Cl.
G06F 17/21    (2006.01)
G06F 16/48    (2019.01)
G06F 16/44    (2019.01)
H04L 29/06    (2006.01)

(52) U.S. Cl.
CPC .............. *G06F 16/48* (2019.01); *G06F 16/44* (2019.01); *H04L 65/4084* (2013.01); *H04L 65/4092* (2013.01)

(58) Field of Classification Search
None
See application file for complete search history.

(56) References Cited

U.S. PATENT DOCUMENTS

| 6,907,570 B2 * | 6/2005 | Amir | G06F 17/30017 707/E17.009 |
|---|---|---|---|
| 9,430,115 B1 * | 8/2016 | Yun | G06F 17/30843 |
| 2009/0103887 A1 * | 4/2009 | Choi | G06F 17/30793 386/241 |
| 2009/0158326 A1 * | 6/2009 | Hunt | G06F 3/04817 725/38 |
| 2015/0063781 A1 * | 3/2015 | Silverman | H04N 21/4126 386/241 |

OTHER PUBLICATIONS

Pennington, et al. *GloVe: Global Vectors for Word Representation*, Stanford University, Stanford, California, Oct. 2014. pp. 1-12.
(Continued)

*Primary Examiner* — Nhat Huy T Nguyen
(74) *Attorney, Agent, or Firm* — Farjami & Farjami LLP

(57) ABSTRACT

There is provided a system including a non-transitory memory storing a media library including an ordered plurality of media contents, each including a plurality of attribute tags, and a hardware processor configured to provide a user interface for display on a user device for navigating the media contents, receive a user input from the user device for playing one or more of the ordered media contents based on a first attribute tag of the plurality of attribute tags, stream a first portion of a first media content to the user device, based on the first attribute tag of the media content selected by the user input, and stream a second portion of a second media content to the user device following the first portion of the first media content, based on the first attribute tag of the media content selected by the user input.

18 Claims, 10 Drawing Sheets

(56) References Cited

OTHER PUBLICATIONS

Mikolov, et al. *Distributed Representations of Words and Phrases and their Compositionality*, google.com. Oct. 2013. pp. 1-9.
Woodsend, Kristian, and Lapata, Mirella. *Distributed Representations for Unsupervised Semantic Role Labeling*, Institute for Language, Cognition, and Computation School of Informatics, University of Edinburgh, England. Sep. 2015. pp. 2482-2491.
Titov, Ivan, and Klementiev, Alexandre. *A Bayesian Approach to Unsupervised Semantic Role Induction*, Saarland University Germany. Apr. 2012. pp. 1-11.
Titov, Ivan, and Khoddam, Ehsan. *Unsupervised Induction of Semantic Roles within a Reconstruction-Error Minimization Framework*, Institute for Logic, Language and Computation, Universiteit van Amsterdam, The Netherlands. 2015. pp. 1-12.
Levy, Omer, and Goldberg, Yoav. *Dependency Based Word Embeddings*, Computer Science Department, Bar-Ilan University, Israel. Apr. 2014. pp. 302-308.
Lang, Joel, and Lapata, Mirella, *Similarity-Driven Semantic Role Induction via Graph Partitioning*, University of Geneva, Switzerland, and University of Edinburgh, England, Sep. 2014, pp. 633-669.
Lang, Joel, and Lapata, Mirella. *Unsupervised Semantic Role Induction via Split-Merge Clustering*, University of Geneva, Switzerland, and University of Edinburgh, England. Jun. 2011. pp. 1-10.
Garg, Nikhil, and Henderson, James. *Unsupervised Semantic Role Induction with Global Role Ordering*, University of Geneva, Switzerland. Jul. 2012. pp. 145-149.

\* cited by examiner

SYSTEMS AND METHODS FOR STREAMING MEDIA CONTENTS BASED ON ATTRIBUTE TAGS

BACKGROUND

Television shows, movies, and other media contents typically include elements that appear in more than one episode, including storylines that span multiple episodes, characters that appear in more than one episode, story archetypes that appear in more than one episode, etc. Media contents are conventionally presented such that a scene portraying one storyline follows a scene from a different storyline, where each storyline may include some of the same characters and/or different characters. Alternating between various storylines allows media contents to portray scenes that happen at the same time, but in different locations, without breaking the continuity of the story. Presentation of multiple storylines in alternating scenes also allows characters to cross between the various storylines in the media content. However, viewing media contents in the conventional manner may cause the viewer to forget or miss details from one scene that are important to a storyline before the media content presents the next scene from that storyline.

SUMMARY

The present disclosure is directed to systems and methods for streaming media contents based on attribute tags, substantially as shown in and/or described in connection with at least one of the figures, as set forth more completely in the claims.

DETAILED DESCRIPTION

Figure 1:
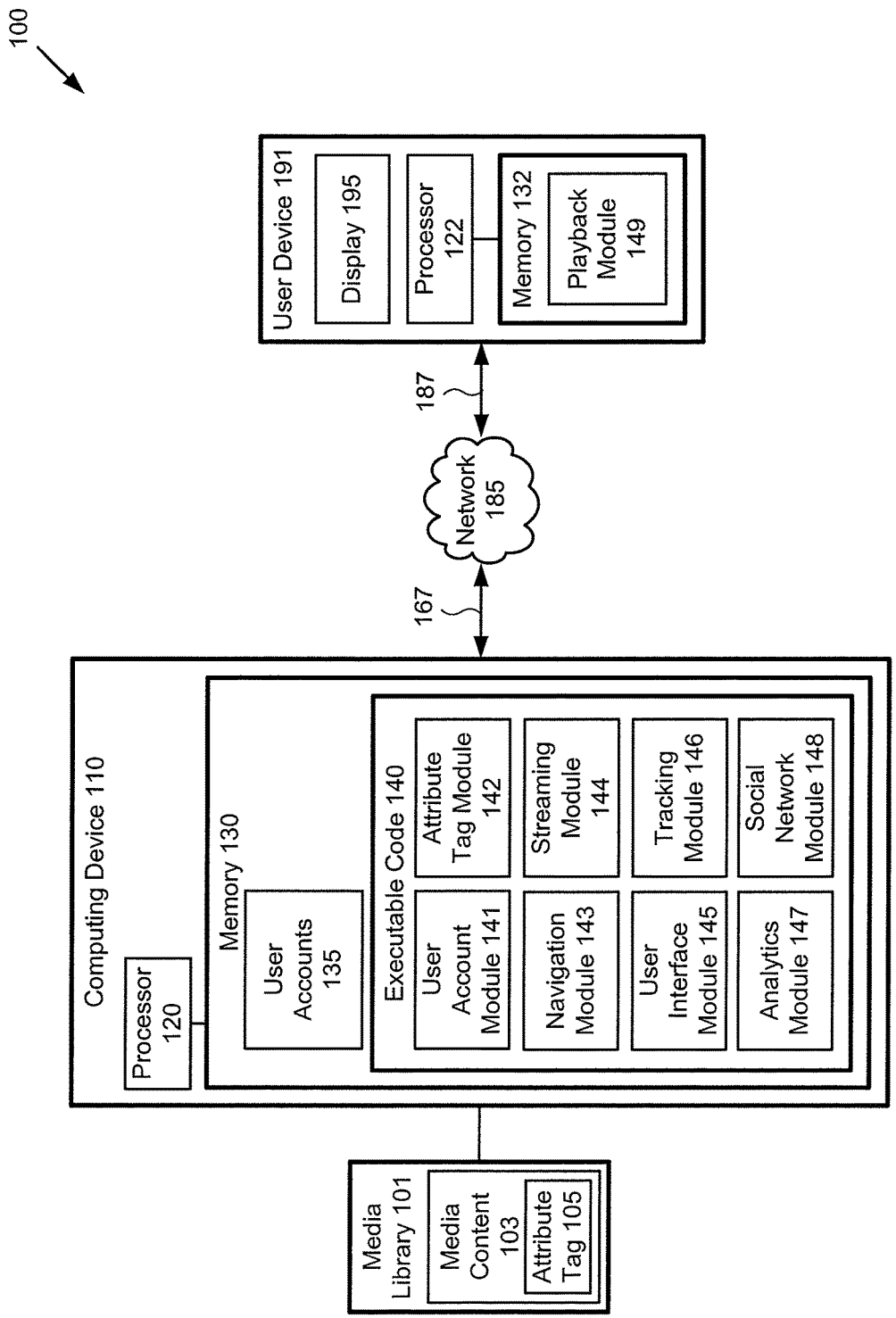
FIG. 1 shows a diagram of an exemplary system for streaming media contents based on attribute tags, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for streaming media contents based on attribute tags, according to one implementation of the present disclosure. System 100 includes media library 101, computing device 110, network 185, and user device 191. Media library 101 may be a memory device storing one or more media contents, such as media content 103. Media library 101 may be stored in memory 130. In some implementations, media content may include an ordered plurality of media contents, such as a plurality of episodes of a television show. In other implementations, media library 101 may include a plurality of series, such as a first series and a second series that occasionally include crossover elements from the other series. For example, media library 101 may include a first series about a superhero that includes the superhero with a helper, and a villain. In some implementations, the helper may be another superhero making a guest appearance in the first series. Media library 101 may also include a second series in which the helper superhero from the first series is the main superhero. Media library 101 may be stored on a local device, on a server, such as a content provider server, on a plurality of servers, etc.

Attribute tag 105 may include information that describes an aspect of media content 103, such as a genre of media content 103, one or more characters appearing in media content 103, one or more actors appearing in media content 103, a storyline of media content 103, a setting of media content 103 and/or location depicted in media content 103, a story archetype of media content 103, a character archetype of one or more characters of media content 103, an action depicted in media content 103, etc. In some implementations, attribute tag 103 may include information about a portion of media content 103, such as a scene, an act, etc. In some implementations, attribute tag 105 may be included in media content 103 as metadata, in a metadata container, etc.

Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes user accounts 135 and executable code 140. User accounts 135 may be a database storing information related to a plurality of user accounts, such as user name and login information. In some implementations, user accounts 135 may store a viewing history for each user account including information related to viewed media contents. Executable code 140 includes one or more software modules stored in memory 130 for execution by processor 120 of computing device 110. As shown in FIG. 1, executable code 140 includes user account module 141, attribute tag module 142, navigation module 143, streaming module 144, user interface module 145, tracking module 146, analytics module 147, and social network module 148.

User account module 141 is a software module stored in memory 130 for execution by processor 120 to track and store user viewing activity. In some implementations, user account module 141 may require a user to login before accessing media library 101. When a user views media content 103, user account module 141 may store a record of that viewing in user accounts 135. User account module 141 may store a record for each time media content 103 is viewed. Based on the viewing history of a user account, user account module 141 may develop a user account profile including preferences inferred from patterns in the attribute tags associated with media content 103 and other media contents viewed using a particular user account of user accounts 135.

Attribute tag module 142 is a software module stored in memory 130 for execution by processor 120 to track attribute tags associated with media content 103. In some implementations, attribute tag module 142 may track attribute tag 105 and records various aspects of media content 103 indicated by attribute tag 105 in user accounts 135. For example, when a user signs in to his/her user account and streams media content 103, attribute tag module 142 may record aspects of media content 103 indicated by attribute tag 105, such as a genre of media content 103, the actors in media content 103, one or more storylines included in media content 103. Attribute tag module 142 may track and record attribute tags associated with one or more portions of media content 103, such as an attribute tag associated with a scene of media content 103, an act of media content 103, etc. Tracking attribute tags associated with portions of media content 103 may provide more accurate viewing history for a user account, and may thereby allow a more nuanced analysis of the viewing activity associated with the user account.

Navigation module 143 is a software module stored in memory 130 for execution by processor 120 to navigate media contents included in media library 101, including media content 103. In some implementations, navigation module 143 may allow a user to navigate media content 103 and/or media library 101. Navigation of media content 103 may include playback of media content 103 in a conventional manner, e.g., beginning at the first scene in media content 103 and continuing through media content 103 scene by scene in a linear manner In other implementations, navigating media content 103 may include playback of media content 103 based on attribute tag 105. For example, attribute tag 105 may indicate a storyline, such as a relationship between two characters in media content 103. The relationship indicated by attribute tag 105 may not be included in each scene of media content 103. Navigation module 143 may allow playback of scenes of media content 103 that include the relationship indicated by attribute tag 105.

Streaming module 144 is a software module stored in memory 130 for execution by processor 120 to stream media content 103 to user device 191. In some implementations, streaming module 144 may receive a playlist from navigation module 143 including a plurality of scenes of media content 103 to stream to user device 191. For example, navigation module 143 may create a playlist of scenes from navigation module 143 and may stream the scenes from the playlist to user device 191.

User interface module 145 is a software module stored in memory 130 for execution by processor 120 to present one or more user interfaces to a user. User interface module 145 may present media contents of media library 101, including media content 103, to a user. In some implementations, user interface module 145 may present the user with a user interface that arranges media contents of media library 101 by title, by type of media contents, such as television shows, movies, etc. In other implementations, user interface module 145 may present media contents of media library 101, including media content 103, arranged according to one or more attribute tags. For example, user interface module 145 may present a user interface allowing the user to select an attribute tag by which to search or organize media library 101.

Tracking module 146 is a software module stored in memory 130 for execution by processor 120 to track and record media contents viewed while logged in to a user account. Tracking module 146 may track the attribute tags of each media content and each scene viewed and may built a user profile based on the viewing history. Tracking module 146 may track and record viewing activity associated with the user account including the initiation of media content 103, viewing progress through media content 103, if any parts of media content 103 are re-watched, if any parts of media content 103 are partially viewed, if viewing of a part of media content 103 that was previously partially viewed is subsequently completed, etc. In some implementations, tracking module 146 may track and record series-level data included in attribute tag 105, episode-level data included in attribute tag 105, act-level data included in attribute tag 105, scene-level data included in attribute tag 105, etc.

Analytics module 147 is a software module stored in memory 130 for execution by processor 120 to analyze the viewing history of one or more user accounts. In some implementations, analytics module 147 may determine, based on the viewing history of a user account, that a user using the user account enjoys media contents having a certain story archetype, storyline, character, or any other attribute tag. In some implementations, analytics module 147 may infer the preferred attribute tag or attribute tags based on the viewing activity of the user account, or analytics module 147 may rely on a user input indicating a preference for media contents having the preferred attribute tag or attribute tags.

Social network module 148 is a software module stored in memory 130 for execution by processor 120. In some implementations, social network module 148 may analyze the viewing histories of user accounts in user accounts 135. Based on similarities in viewing activity, similarities in tag attribute preference, common or similar interests, etc., social network module 148 may recommend that a first user account connect with a second user account. Connecting user accounts may allow the viewing history of each account to be available to the other account. Social network module 148 may notify followers of a user account of viewing activity of that account, for example, by sending an email or other notification when the first user account views a new media content of media library 101. Social network module 148 may allow a user to be notified of or become aware of media contents based on recommendations from executable code 140 or from other users directly.

Network 185 is a computer network such as the Internet. In some implementations, computing device 110 may be connected to network 185 via connection 167, and user device 191 may be connected to network 185 via connection 187. Connection 167 may be a wired connection or a wireless connection. Connection 187 may be a wired connection or a wireless connection. User device 191 may be a device suitable for viewing media content 103, such as a television, a computer, a tablet computer, a mobile device, etc. As shown in FIG. 1, user device 191 includes processor 122, memory 132, and display 195. Processor 122 is a hardware processor, such as a CPU used in computing devices. Memory 132 is a non-transitory storage device for storing computer code for execution by processor 122, and also storing various data and parameters. As shown in FIG. 1, memory 132 includes playback module 149. Playback module 149 is a software module for execution by processor 122 to playback media content 103. Playback module 149 may receive media content 103 from streaming module 144 for playback on display 195.

Figure 2:
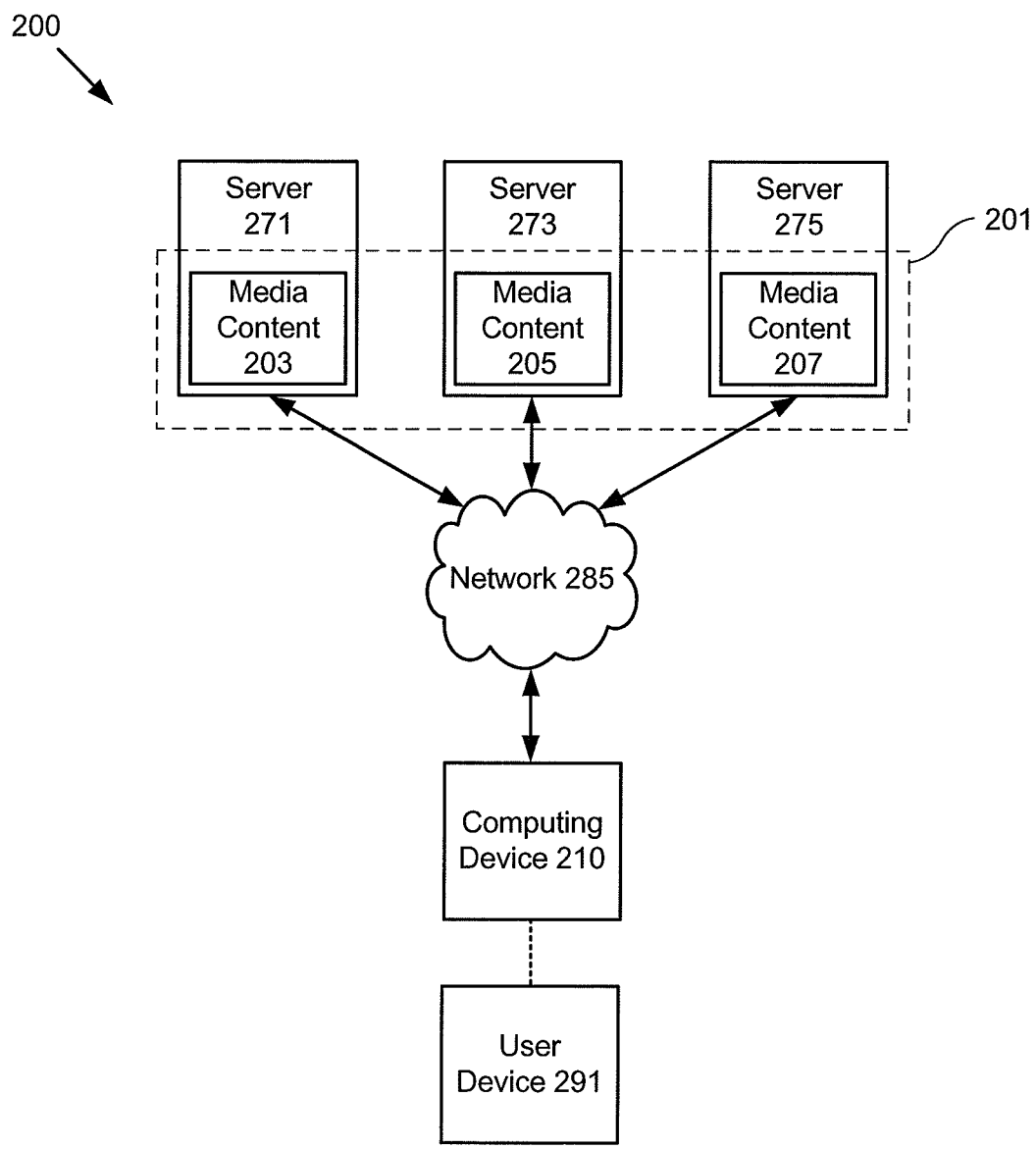
FIG. 2 shows a diagram of another exemplary system for streaming media contents based on attribute tags, according to one implementation of the present disclosure.

FIG. 2 shows a diagram of another exemplary system for streaming media contents based on attribute tags, according to one implementation of the present disclosure. Diagram 200 includes media library 201, network 285, computing device 210, and user device 291. As shown in FIG. 2, media library 201 includes media content 203, media content 205, and media content 207, which may be stored in the memories of server 271, server 273, and sever 275, respectively. Network 285 may be a computer network, such as the Internet. Computing device 210 may be a computer, a television, a set-top box, a media player such as a digital video disc (DVD) player, etc. Computing device 210 may transmit a request to one or more of servers 271-275 to stream media content 103. User device 291 may be a device for viewing media content 203, media content 205, and/or media content 207. In some implementations, user device 291 may be a tablet computer, a television, a mobile device, etc. In some implementations, user device 291 may receive input from a user to sign into a user account, stream media contents of media library 201, navigate media contents of media library 201, etc.

Figure 3:
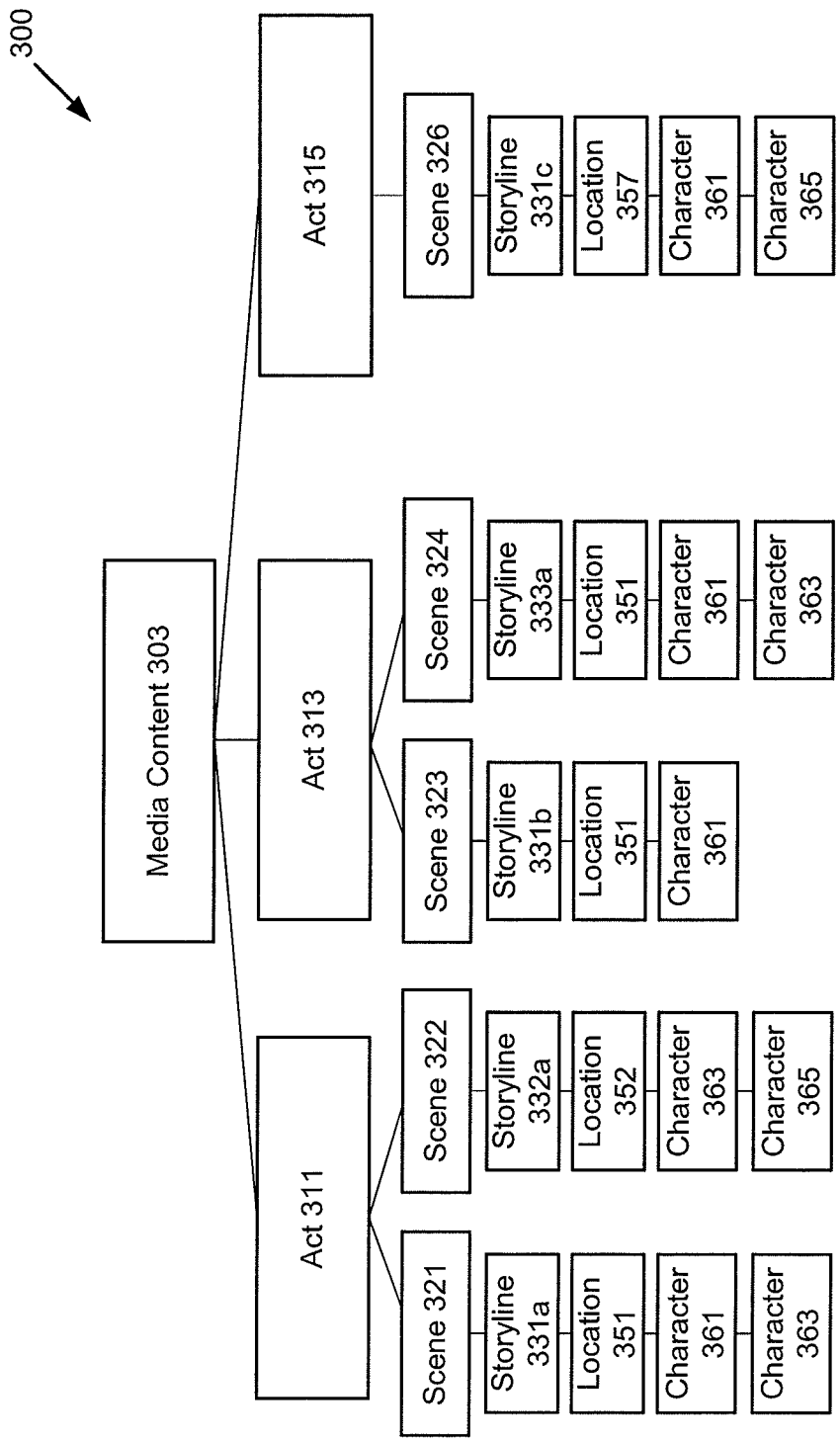
FIG. 3 shows a diagram of an exemplary media content, according to one implementation of the present disclosure.

FIG. 3 shows a diagram of an exemplary media content, according to one implementation of the present disclosure. Diagram 300 shows a hierarchy of component parts of media content 303. Media content 303 includes act 311, act 313, and act 315. An act may include a significant portion of media content 303. For example, an act of a television show may run from the beginning of the show to the first commercial break, form one commercial break to the next commercial break, or from the last commercial break to the end of the show. Each act may include one or more constituent scenes. Act 311 includes scenes 321 and scene 322, act 313 includes scenes 323 and scene 324, and act 315 includes scenes 326.

Each scene in media content 303 may include a storyline including one or more characters involved in the story that takes place in a particular setting or location. In some implementations, a storyline of media content 303 may appear in act 311, act 313, and/or act 315. Similarly, settings, locations, and/or characters may appear in one or more acts and/or scenes of media content 303. As shown in FIG. 3, scene 321 includes storyline 331*a* taking place in location 351 and including character 361 and character 363. Scene 322 includes storyline 332*a* taking place in location 352 and including character 363 and character 365. Scene 323 includes storyline 331*b*, where storyline 331*b* is a subsequent part of storyline 331*a*, taking place in location 351 and including character 361. Scene 324 includes storyline 333*a* taking place in location 351 and including character 361 and character 363. Scene 326 includes storyline 331*c* taking place in location 357 and including character 361 and character 365. In some implementations, media content 303 may include an attribute tag for each storyline, location, and/or character included therein. The attribute tags may include act and scene information allowing navigation module 143 and streaming module 144 to selectively navigate and stream the acts and scenes that include one or more attribute tags selected by a user. Although media content 303 is shown including act 311, act 313, and act 315, media content 303 may include less than three acts or more than three acts. Each act may include one or more scenes, and each scene may include one or more storylines, locations, characters, etc.

Figure 4:
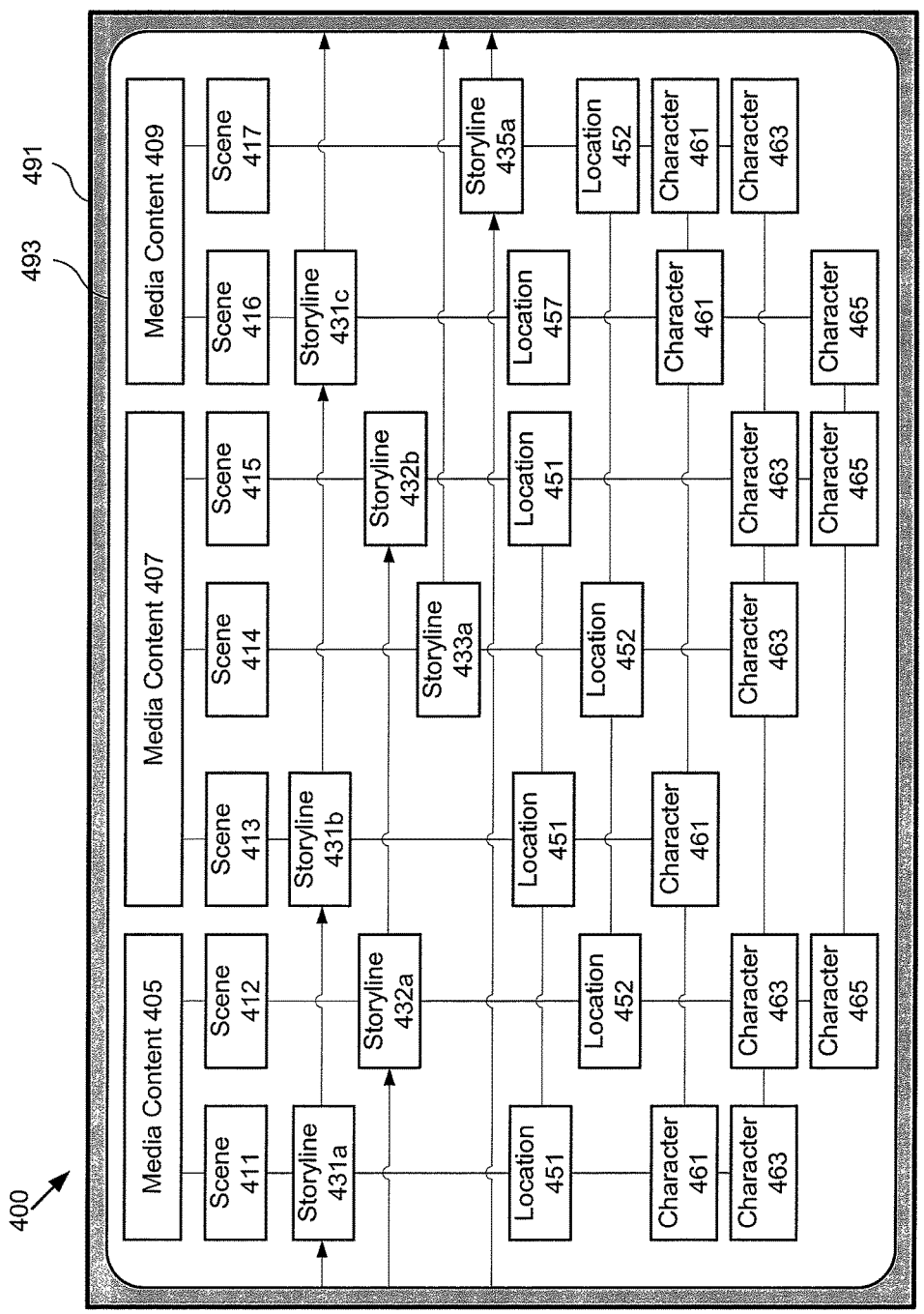
FIG. 4 shows a diagram of an exemplary user interface, according to one implementation of the present disclosure.

FIG. 4 shows a diagram of an exemplary user interface, according to one implementation of the present disclosure. As shown in FIG. 4, display 493 of user device 491 shows user interface 400, including media content 405, media content 407, and media content 409 displayed as an interconnected network showing the various components of each media content and how the components are interconnected. Media content 405 includes scene 411 and 412, media content 407 includes scene 413, scene 414, and scene 415, and media content 409 includes scene 416 and 417. Each scene includes at least a storyline, a location, and a character. As shown in FIG. 4, storyline 431 is included in media content 405, media content 407, and media content 409. More specifically, a first section of storyline 431, namely storyline 431*a*, is included in scene 411 of media content 405, a second section of storyline 431, namely storyline 431*b*, is included in scene 413 of media content 407, and a third section of storyline 431, namely 431*c*, is included in scene 416 of media content 409. As indicated by the arrow leading into storyline 431*a*, storyline 431 may begin prior to scene 411. Similarly, as indicated by the arrow pointing out of storyline 431*c*, storyline 431 may continue in a scene of another media content (not shown).

As shown in FIG. 4, storyline 432 may begin prior to media content 405. Storyline 432 is included in media content 405 as storyline 432*a* and terminates in storyline 432*b* of media content 407. Storyline 433 begins with storyline 433*a* in scene 414 of media content 407 and continues in another media content (not shown). Storyline 435 begins in an earlier media content (not shown), continues in storyline 435*a* of scene 417, and continues in a subsequent media content (not shown). Each scene takes place in a location. For example, scene 411, scene 413, and scene 415 each take place in location 451. Location 451 may be a room, a building, an outdoor location, etc. In addition to various scenes taking place in a location, various storylines may take place in a location. For example, both storyline 431 and storyline 432 include scenes taking place in location 451. FIG. 4 also demonstrates that a character may appear in a plurality of scenes, storylines, and locations. For example, character 461 appears in scene 411, scene 413, scene 416, and scene 417; storyline 431 and storyline 435; and location 451, location 452, and location 457. Character 463 and character 465 also appear in various scenes, storylines, and locations.

In some implementations, a user may navigate media library 101 using user interface displayed in display 493 of user device 491. For example, a user may want to watch a particular storyline, such as storyline 431, and may want to begin at storyline 431*a*. The user may select storyline 431*a* by clicking storyline 431*a* with a mouse, selecting storyline 431*a* with a television remote control device, etc. Streaming module 144 may stream storyline 431, beginning with storyline 431*a,* to user device 491. At the end of storyline 431*a,* streaming module 144 may stream storyline 431*b,* even though storyline 431*b* occurs in a different media content. Following storyline 431*b,* steaming module 144 may seamlessly transition to storyline 431*c.* Using user interface 400, a user may elect to watch part or all of a media content, such as by selecting scene 413 to view only scene 413 or by selecting media content 407 to view media content 407 in its entirety. The user may watch a storyline by selecting a portion of the storyline, and streaming module 144 may stream the storyline beginning with the selected portion.

In some implementations, the user may want to watch events that occur in a setting or at a location and may view them by selecting the desired setting or location. For example, the user may want to see what happens in location 452. The user may select location 452 of scene 412 and streaming module 144 may stream scene 412, followed seamlessly by scene 414 and then scene 417, allowing the user to linearly view the events taking place in location 452. In another example, the user may want to follow a character. The user may select a character from user interface 400, such as character 465, and streaming module 144 may stream scene 412 followed seamlessly by scene 415 and scene 416 based on the user selection of character 465.

Figure 5A:
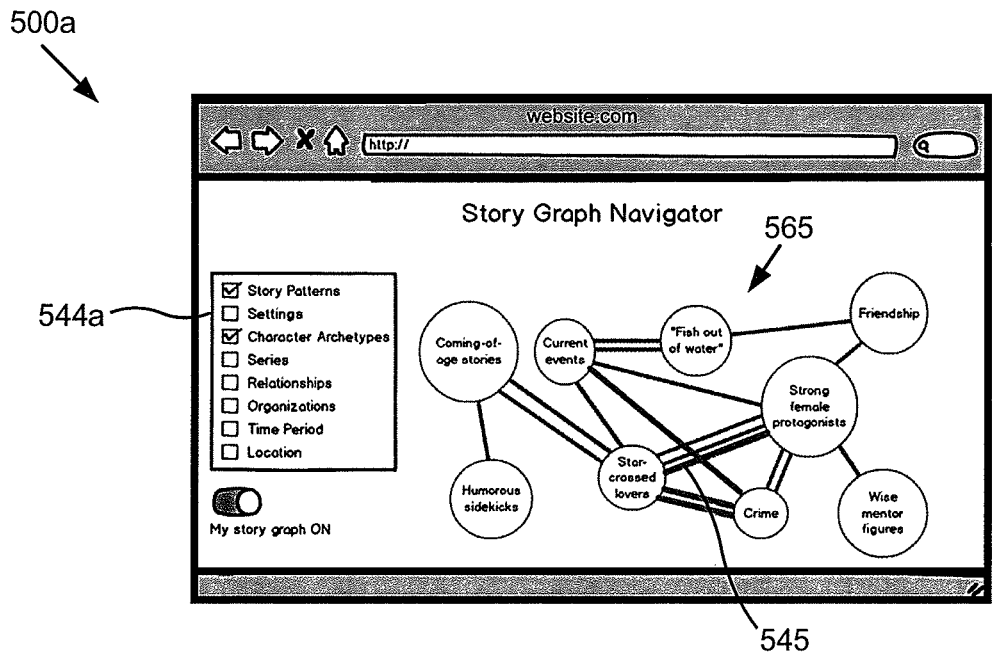
FIG. 5a shows a diagram of an exemplary media content navigation display, according to one implementation of the present disclosure.

FIG. 5*a* shows a diagram of an exemplary user interface for content navigation, according to one implementation of the present disclosure. Diagram 500*a* shows a story graph navigation display including graph 565. Graph 565 includes a plurality of nodes connected by a plurality of edges. Each node of the plurality of nodes may represent an attribute tag. In some implementations, the size of each node of the plurality of nodes may correspond to the viewing history of the user account. For example, the more media contents that have been watched including a particular attribute tag the larger the node corresponding to that attribute tag will be in the story graph navigation display. In some implementations, the navigation display may include a filter menu including a selectable list of filters. A user may filter media contents and/or attribute tags included in the navigation display by checking or un-checking filters in filter list 544*a*. The filter list may include options to filter by title, series, media content type, or any other attribute tag.

Figure 5B:
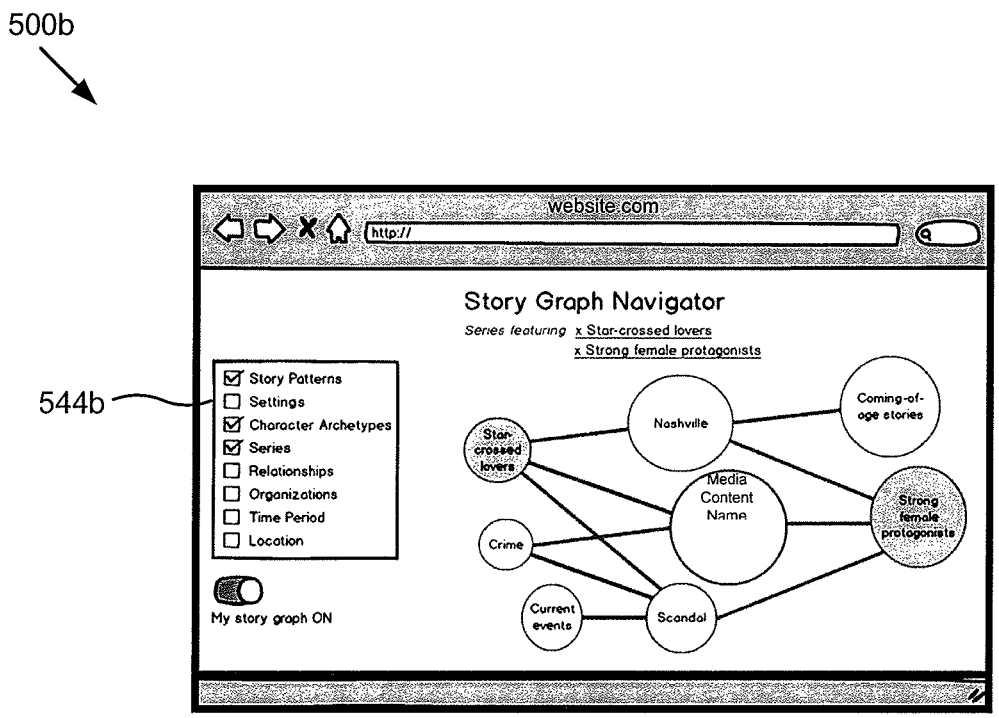
FIG. 5b shows a diagram of another exemplary media content navigation display resulting from a user interaction with the media content navigation display of FIG. 5a, according to one implementation of the present disclosure.

FIG. 5*b* shows a diagram of another exemplary user interface for content navigation resulting from a user interaction with the media content navigation display of FIG. 5*a,* according to one implementation of the present disclosure. Diagram 500*b* displays a story graph navigation display that may result if a user were to select edge 545 connecting the Star-crossed Lovers node and the Strong Female Protagonists node in FIG. 5*a*. As shown in FIG. 5*b,* the Series filter has been selected in filter list 544*b*, resulting in the Story Graph Navigator displaying series that share attribute tags corresponding to Story Patterns and Character Archetypes.

Figure 6:
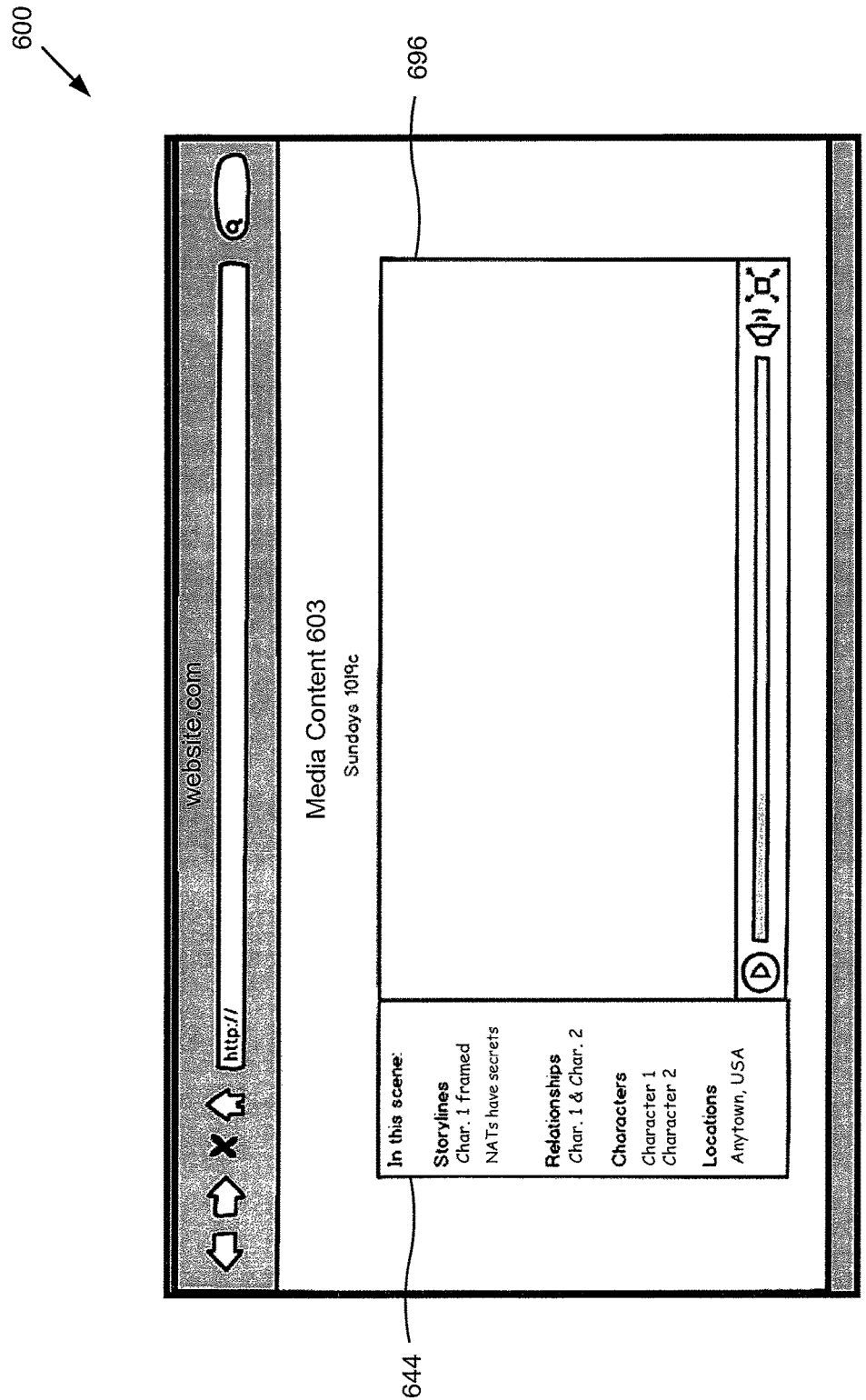
FIG. 6 shows a diagram of another exemplary media content navigation display, according to one implementation of the present disclosure.

FIG. 6 shows a diagram of another exemplary user interface for content navigation, according to one implementation of the present disclosure. Diagram 600 shows media content window 696 and content navigation menu 644. Content navigation menu 644 includes selectable options indicating attribute tags that are included in the media content 603. In some implementations, attribute tags included in content navigation menu 644 may change with each new scene of media content 603, or within each scene as the scene progresses. For example, when a character of media content 603 appears in media content 603 for the first time in an episode or a scene, the name of the character may be added to content navigation menu 644. When a character leaves the scene, the name of the character may be removed from content navigation menu 644, relationships including the character may be removed from content navigation menu 644, storylines focused on that character may be removed from content navigation menu 644, etc. Similarly, as other attribute tags become elements of media content 603 may be included in content navigation menu 644 as they are relevant in the scene depicted in media content window 696.

A user may select a storyline from content navigation menu 644 to view the selected storyline. The user may select a relationship to view scenes of media library 101 that include the selected relationship, a character to view scenes of media library 101 that include the selected character, a location to view scenes of media library 101 that include the selected location, or any other attribute tag that may be included in media library 101. As shown in FIG. 6, content navigation options may be displayed with media content 603. In some implementations, when a user clicks one of the selectable links of content navigation menu 644, navigation module 143 may display a user interface including additional scenes and/or content related to the selected link. The user interface may be displayed in place of content navigation menu 644, in a new menu, in a new screen, etc.

Figure 7A:
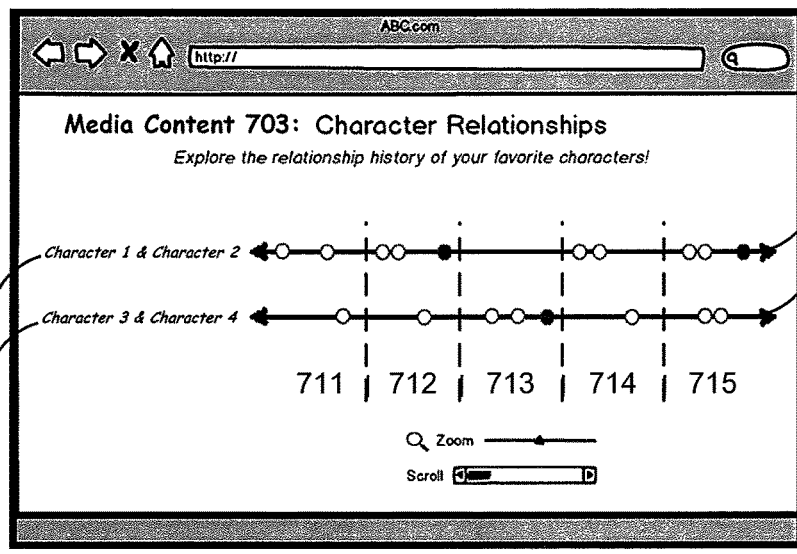
FIG. 7a shows a diagram of an exemplary media content navigation display, according to one implementation of the present disclosure.

FIG. 7*a* shows a diagram of an exemplary user interface for content navigation, according to one implementation of the present disclosure. Diagram 700*a* shows two of the character relationships included in a media content 703. In some implementations, media content 103 may include a plurality of relationships between various characters of media content 103. Each relationship included in Media content 703 may be listed, and a corresponding timeline may be displayed indicating a portion of each episode in which the relationship attribute tag appears. For example, Character 1 and Character 2 have relationship 767 shown on timeline 771. Circles on timeline 771 indicate scenes depicting relationship 767. As shown in FIG. 7, relationship 767 is included twice in episode 711, once early in the episode and once late in the episode, as indicated by the selectable markers on the timeline corresponding to relationship 767. Their relationship continues to develop in episode 712, episode 714, and episode 715, but does not appear in episode 713. Timeline 773 depicts relationship 769 between Character 3 and Character 4. As shown in FIG. 7, relationship 769 is included in each episode 711-715.

Figure 7B:
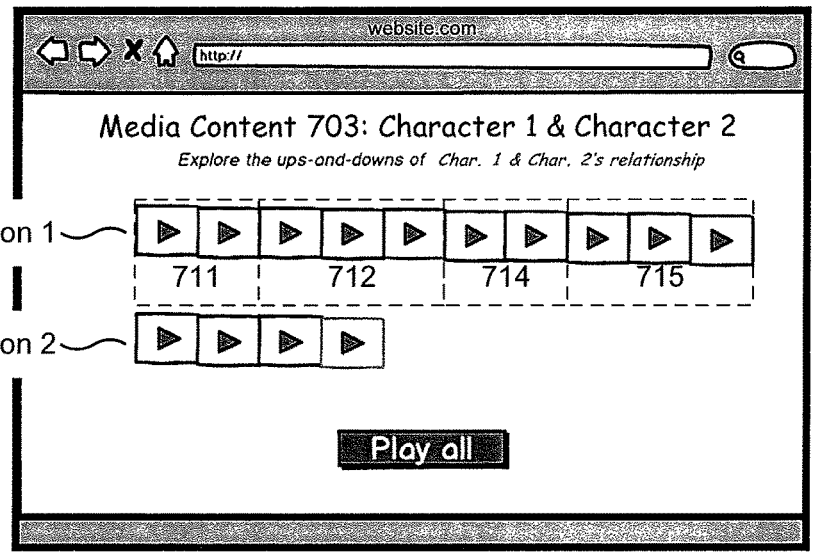
FIG. 7b shows a diagram of another exemplary media content navigation display resulting from a user interaction with the media content navigation display of FIG. 7a, according to one implementation of the present disclosure.

FIG. 7*b* shows a diagram of another exemplary user interface for content navigation resulting from a user interaction with the media content navigation display of FIG. 7*a,* according to one implementation of the present disclosure. In some implementations, the content navigation display of FIG. 7*b* may result from a user selecting the relationship including characters Character 1 and Character 2 from character relationship 767 for Character 1 & Character 2 in FIG. 7*a*. A user may select a play button from the user interface to play the corresponding scene involving the relationship between Character 1 and Character 2 in one or more of episode 711, episode 712, episode 714 or episode 715. Alternatively, the user may select the Play All button to view Character 1 and Character 2's relationship scene by scene. The grayed out episode in season two may indicate an upcoming episode, and selecting that episode may play a teaser for the development of Character 3 and Character 4's relationship in the upcoming episode.

Figure 8:
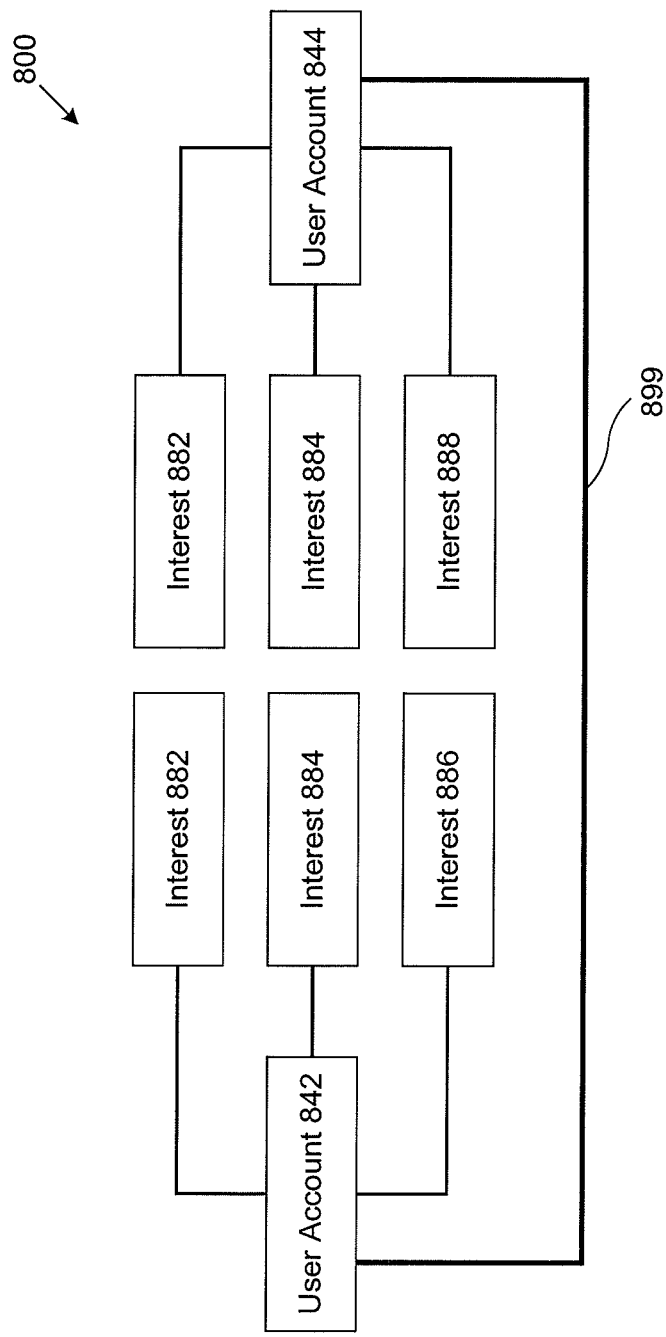
FIG. 8 shows a diagram of an exemplary social function of the system in FIG. 1, according to one implementation of the present disclosure.

FIG. 8 shows a diagram of an exemplary social function of the system in FIG. 1, according to one implementation of the present disclosure. Diagram 800 shows user account 842, including interest 882, interest 884, and interest 886, and user account 844, including interest 882, interest 884, and interest 888. In some implementations, interests 882, 884, and 886 may be inferred by executable code 140 based on a viewing history of user account 842, and interests 882, 884, and 888 may be inferred by executable code 140 based on a viewing history of user account 844. User account 842 and user account 844 may belong to users who are not socially acquainted with one another, and may not live in the same geographic area. Executable code 140 may, based on the similar viewing activity of user account 842 and user account 844, suggest to one or both of user accounts 842 and 844 that they may like to follow the other, as indicated by connection 899. For example, based on user account 842 including interest 882 and interest 884, and user account 844 also including interest 882 and interest 884, executable code 140 may infer that user account 842 may be interested in media contents viewed by user account 844, and vice versa. In some implementations, executable code 140 may display to user account 842 media contents liked by user account 844 that user account 842 has not viewed.

Figure 9:
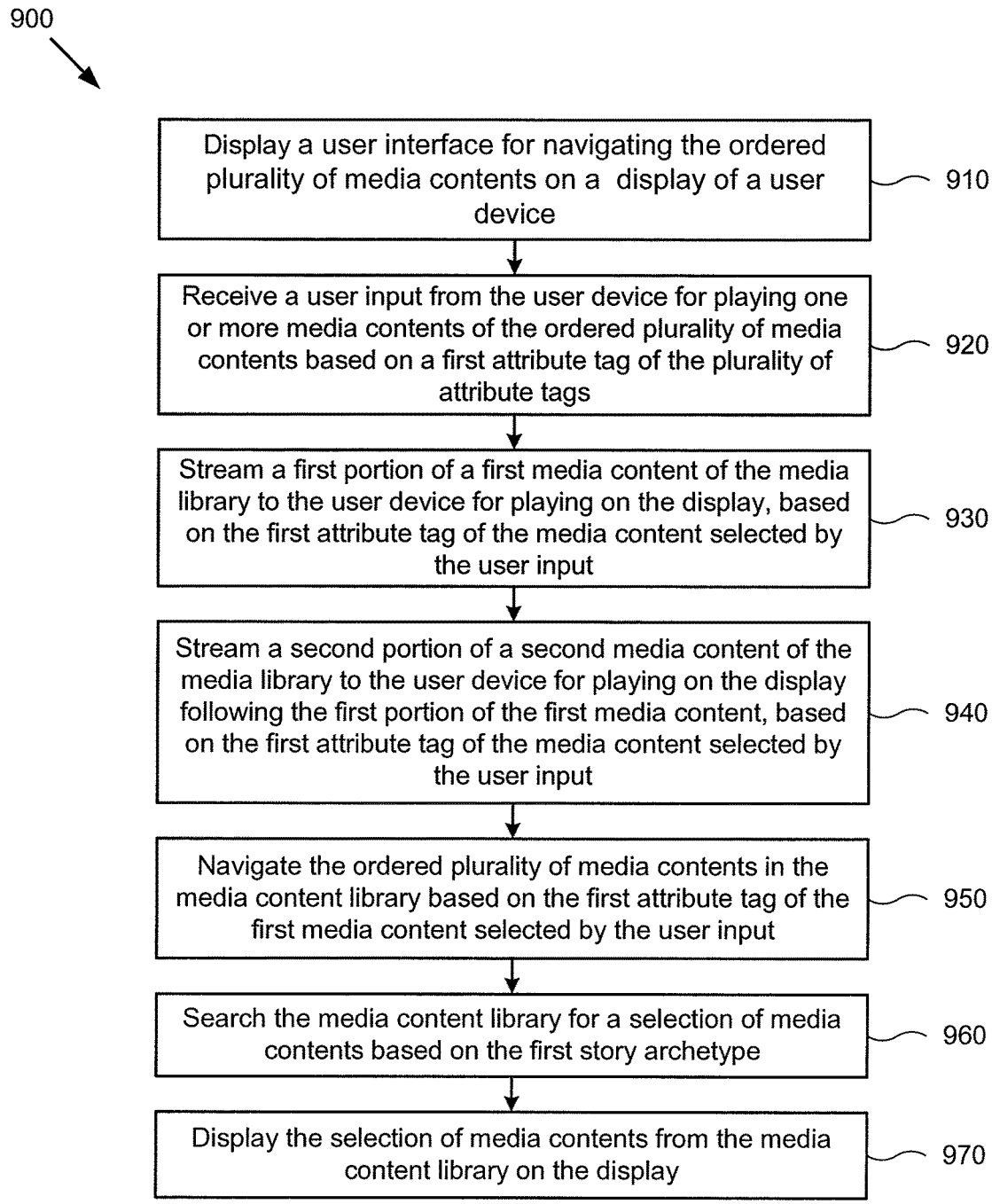
FIG. 9 shows a flowchart illustrating an exemplary method of streaming media contents based on attribute tags, according to one implementation of the present disclosure.

FIG. 9 shows a flowchart illustrating an exemplary method of streaming media contents based on attribute tags, according to one implementation of the present disclosure. Method 900 begins at 910, where executable code 140 provides a user interface for display on user device 191 for navigating the ordered plurality of media contents. Navigation module 143 may create a user interface for display on display 195. In some implementations, the user interface may include elements of media library 101 based on title, such as listing media contents in episode order organized by the title of a series. In other implementations, the user interface may be organized by one or more attribute tags, allowing the user to select a viewing experience based on an attribute tag such as a storyline.

At 920, executable code 140 receives a user input from user device 191 for playing one or more media contents of the ordered plurality of media contents based on a first attribute tag of the plurality of attribute tags. User device 191 may transmit a request to streaming module 144 to stream media content 103 or a portion thereof based on attribute tag 105. For example, the user may select a storyline from the user interface, the storyline running through a plurality of media contents of media library 101 including media content 103. Method 900 continues at 930, where executable code 140 streams a first portion of a media content 103 of media library 101 to user device 191 for playing on display 195, based on attribute tag 105 of media content 103 selected by the user input. In response to the request transmitted by user device 191, streaming module 144 may stream part or all of media content 103 for display on display 195.

At 940, executable code 140 streams a second portion of a second media content of media library 101 to user device 191 for playing on display 195 following the first portion of media content 103, based on attribute tag 105 of media content 103 selected by the user input. In some implementations, an attribute tag selected by the user may include scenes from a plurality of media contents in media library 101. For example, a storyline that begins in media content 103 may run into and/or through subsequent media contents in a series that includes media content 103. After streaming the portion of media content 103 including the selected attribute tag, streaming module 144 may stream the relevant portion of the subsequent media contents that include the attribute tag selected by the user.

At 950, executable code 140 navigates the ordered plurality of media contents in media library 101 based on attribute tag 105 of media content 103 selected by the user input. In addition to streaming media contents of media library 101 for playback based on attribute tags, navigation module 143 may enable a user to forward through media contents of media library 101 based on a selected attribute tag. For example, if the user watches a scene based on a storyline, and while viewing the scene presses a control to forward through media content 103, such as a fast-forward control, navigation module 143 may forward through scenes in media library 101 based on the selected storyline in contrast to the conventional way of forwarding based on the time code of the media contents. In some implementations, navigation module 143 may allow the user to forward through media contents based on a character, a setting or location, or any other attribute that may be indicated by attribute tag 105. Navigation module 143 may enable reversing, such as rewinding, scene-skipping, and other media content navigation controls typically executed on the time code of a media content to be executed based on the attribute tag selected by a user.

At 960, executable code 140 searches the media library 101 for a selection of media contents based on an attribute tag, such as a story archetype. In some implementations, analytics module 147 may determine, based on the viewing history of a user account, that a user using the user account enjoys media contents having a certain story archetype. In some implementations, analytics module 147 may infer the preferred story archetype based on the viewing activity of the user account, or analytics module 147 may rely on a user input indicating a preference for media contents having the preferred story archetype. Analytics module 147 may determine a plurality of media contents fit the preferred story archetype to a varying degree, such as a first media content of media library 101 matching the preferred story archetype 70% and a second media content of media library 101 matching the preferred story archetype 85%, etc.

At 970, executable code 140 displays the selection of media contents from media library 101 on display 195. In some implementations, navigation module 143 may display a user interface including media contents arranged according to the preferred story archetype of the user account. The user interface may indicate that media contents that more highly match the preferred story archetype are more strongly suggested, while those media contents with a less strong match to the preferred story archetype are recommended less strongly. The strength of the recommendation of a media content may be indicated by a rating, such as an indication by analytics module 147 that the user is likely to rate the media content three (3) out of five (5) stars based on the preferred story archetype. The user may select from the displayed media contents to watch one of the suggested media contents.

Figure 10:
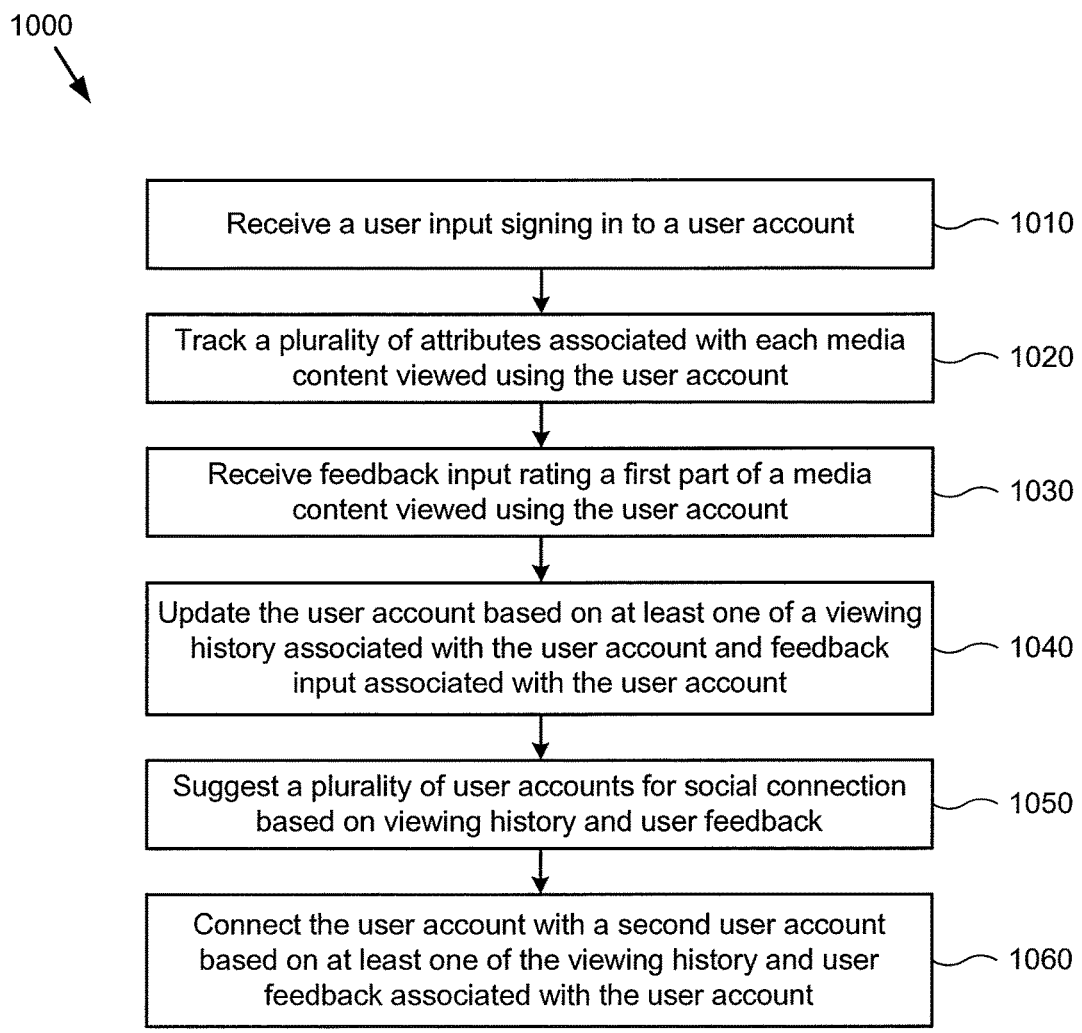
FIG. 10 shows a flowchart illustrating an exemplary method of streaming media contents based on attribute tags, according to one implementation of the present disclosure.

FIG. 10 shows a flowchart illustrating an exemplary method of streaming media contents based on attribute tags, according to one implementation of the present disclosure. Method 1000 begins at 1010, where executable code 140 receives a user input signing in to a user account. In some implementations, a user may enter login information using user device 191. User device 191 may transmit the login information to computing device 110, and user account module 141 may verify the login information. Once account module 141 verifies the login information, user account module 141 may access the associated user account in user accounts 135. The associated user account in user accounts 135 may include a viewing history, user preferences associated with the user account based on inference and/or user input preferences, etc.

At 1020, executable code 140 tracks a plurality of attributes associated with each media content viewed using the user account. In some implementations, tracking module 146 may record attribute tag 105 associated with media content 103 viewed using the user account. Tracking module 146 may save the record of attribute tag 105 associated with media content 103 viewed while logged into the user account in user accounts 135. Attribute tag 105 may include information about media content 103, such as the title, actors in media content 103, a genre of media content 103, additional production information about media content 103, etc. In some implementations, media content 103 may include a plurality of episodes of media content, such as when media content 103 includes a television series. Attribute tag 105 may include information about each episode of the television series, such as one or more storylines included in the series and/or included in each episode of the series. Attribute tag 105 may include information about one or more acts in each episode, one or more scenes in each act, information about the characters in each scene, information about relationships between characters in the series, etc.

Tracking module 146 may track and record viewing activity associated with the user account including the initiation of media content 103, viewing progress through media content 103, if any parts of media content 103 are re-watched, if any parts of media content 103 are partially viewed, if viewing of a part of media content 103 that was previously partially viewed is subsequently completed, etc. In some implementations, tracking module 146 may track and record series-level data included in attribute tag 105, episode-level data included in attribute tag 105, act-level data included in attribute tag 105, scene-level data included in attribute tag 105, etc. For example, media content 103 may include three (3) scenes. The first scene may have a duration of four (4) minutes and include three (3) attribute tags including a first storyline attribute tag, a first actor attribute tag, and a first story archetype attribute tag. The second scene may have a duration of three (3) minutes and include three (3) attribute tags including the first storyline attribute tag, a second actor attribute tag, and a second story archetype attribute tag. The third scene may have a duration of six (6) minutes and include three (3) attribute tags including the first storyline attribute tag, the first actor attribute tag, and the second story archetype attribute tag. Tracking module 146 may add each attribute tag of media content 103 to the user account and may include the length of each scene that includes each attribute tag to weight each attribute tag in user accounts 135.

At 1030, executable code 140 receives feedback input rating a first part of a media content viewed using the user account. Feedback input may be direct input or inferred input. For example, as a user is watching media content 103, the user may provide direct input by rating each scene of media content 103, such as by assigning the scene a value of three (3) out of five (5) stars. Feedback may be inferred based on the user actions regarding media content 103. For example, attribute tags of a scene that the user views uninterrupted may be added to user accounts 135, and if the user re-watches media content 103 and/or the same scene of media content 103, a higher rating may be inferred. However, if the user stops watching media content 103 without completing a scene, it may be inferred that the user disliked media content 103, and attribute tags associated therewith may be added to user accounts 135 with a lower rating, indicating the inferred preference of the user.

At 1040, executable code 140 updates the user account based on at least one of a viewing history associated with the user account and feedback input associated with the user account. In some implementations, tracking module 146 may update user accounts 135 based on the viewing activity of the user account, direct input rating media content 103 or a portion thereof, inferred input rating media content 103 or a portion thereof, etc. In other implementations, tracking module 146 may update user accounts 135 based on series-level data included in attribute tag 105, episode-level data included in attribute tag 105, act-level data included in attribute tag 105, scene-level data included in attribute tag 105, etc. In some implementations, executable code 140 may recommend media contents of media library 101 to the user based on the user account and attribute tags of media contents in media library 101. For example, if a user account has a high favorable rating for an actor, executable code 140 may recommend other media contents in which the actor appeared. When a user account has a high favorable rating for a particular story archetype, executable code 140 may recommend other media content of media library 101 from a genre sharing the favorable story archetype.

At 1050, executable code 140 suggests a plurality of user accounts for social connection based on viewing history and user feedback. Social network module 148 may suggest one or more user accounts that share similar interests for social connection. In some implementations, social network module 148 may recommend that a user connect with a second user account based on common attribute tag interests. At 1060, social network module 148 connects the user account with a second user account based on at least one of the viewing history and user feedback associated with the user account. Connecting with one or more other user accounts may allow the user to see media contents viewed by the other user accounts which may expose the user to new and/or alternate media contents. In some implementations, interests in user accounts 135 may be weighted based on direct input and/or inferred input.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing a media library including an ordered plurality of media contents, each of the ordered plurality of media contents including a plurality of attribute tags;
   a hardware processor configured to:
   provide a user interface for display on a user device for navigating the ordered plurality of media contents, wherein each of the ordered plurality of media contents has a hierarchy of acts each including one or more scenes each having a scene attribute tag, wherein each of the one or more scenes includes (a) one or more storylines each having a storyline attribute tag, (b) one or more locations each having a location attribute tag, and (c) characters each having a character attribute tag and one or more character relationship tags, wherein each of the character relationship tags indicates a relationship of its corresponding character with another one of the characters;
receive a user input from the user device for playing one or more media contents of the ordered plurality of media contents selecting a first attribute tag of the plurality of attribute tags, wherein the first attribute tag is one of the character relationship tags;
stream a first scene of a first media content of the media library to the user device for playing on a display, based on the first attribute tag of the media content selected by the user input, wherein the first scene includes the corresponding character and the another character based on the one of the character relationship tags; and
stream a second scene of a second media content of the media library to the user device for playing on the display linearly following the first scene of the first media content, based on the first attribute tag of the media content selected by the user input rather than based on a time code for a next scene following the first scene in the first media content, wherein the second scene includes the corresponding character and the another character based on the one of the character relationship tags.

2. The system of claim 1, wherein the hardware processor further executes the executable code to: navigate the ordered plurality of media contents in the media library based on the first attribute tag of the first media content selected by the user input.

3. The system of claim 2, wherein the first attribute tag of the first media content is a first storyline and navigating the ordered plurality of media contents includes traversing the first storyline across the first media content of the ordered plurality of media contents and the second media content of the ordered plurality of media contents.

4. The system of claim 3, wherein traversing the first storyline includes one of viewing the first storyline, advancing through the first storyline, and reversing through the first storyline.

5. The system of claim 2, wherein the first attribute tag of the first media content is a first location in a scene and the hardware processor further executes the executable code to: search the media library for a selection of media contents based on the first location; and provide the selection of media contents from the media library for playing on the display of the user device.

6. The system of claim 1, wherein the user interface includes a graphic depicting the ordered plurality of media contents based on the scene attribute tag, the storyline attribute tag, the character relationship tags and the character attribute tag.

7. The system of claim 6, wherein the user interface is personalized based on a viewing history of a first user.

8. The system of claim 1, wherein the media library includes a plurality of media contents from a plurality of episodes of a television show.

9. The system of claim 8, wherein the first media content is part of a first series of the television show and the second media content is from a second series of the television show.

10. A method for use with a system including a media library having an ordered plurality of media contents, a non-transitory memory and a hardware processor, the method comprising:
providing, using the hardware processor, a user interface for display on a user device for navigating the plurality of media contents, wherein each of the ordered plurality of media contents has a hierarchy of acts each including one or more scenes each having a scene attribute tag, wherein each of the one or more scenes includes (a) one or more storylines each having a storyline attribute tag, (b) one or more locations each having a location attribute tags and (c) characters each having a character attribute tag and one or more character relationship tags, wherein each of the character relationship tags indicates a relationship of its corresponding character with another one of the characters;
receiving, using the hardware processor, a user input from the user device for playing one or more media contents of the ordered plurality of media contents selecting a first attribute tag of the plurality of attribute tags, wherein the first attribute tag is one of the character relationship tags;
streaming, using the hardware processor, a first scene of a first media content of the media library to the user device for playing on a display, based on the first attribute tag of the media content selected by the user input, wherein the first scene includes the corresponding character and the another character based on the one of the character relationship tags; and
streaming, using the hardware processor, a second scene of a second media content of the media library to the user device for playing on the display following the first scene of the first media content, based on the first attribute tag of the media content selected by the user input rather than based on a time code for a next scene following the first scene in the first media content, wherein the second scene includes the corresponding character and the another character based on the one of the character relationship tags.

11. The method of claim 10, further comprising: navigating, using the hardware processor, the ordered plurality of media contents in the media library based on the first attribute tag of the first media content selected by the user input.

12. The method of claim 11, wherein the first attribute tag of the first media content is a first storyline and navigating the plurality of media contents includes traversing the first storyline across the first media content of the ordered plurality of media contents and the second media content of the ordered plurality of media contents.

13. The method of claim 12, wherein traversing the first storyline includes one of viewing the first storyline, advancing through the first storyline, and reversing through the first storyline.

14. The method of claim 11, wherein the first attribute tag of the first media content is a first location in a scene, and the method further comprises: searching, using the hardware processor, the media library for a selection of media contents based on the first location; and providing, using the hardware processor, the selection of media contents from the media library for playing on the display of the user device.

15. The method of claim 10, wherein the user interface includes a graphic depicting the ordered plurality of media contents based on the scene attribute tag, the storyline attribute tag, the character relationship tags and the character attribute tag.

16. The method of claim 15, wherein the user interface is personalized based on a viewing history of a first user.

17. The method of claim 10, wherein the media library includes a plurality of media contents from a plurality of episodes of a television show.

18. The method of claim 17, wherein the first media content is part of a first series of the television show and the second media content is from a second series of the television show.

\* \* \* \* \*